(12) United States Patent
Ruffing et al.

(10) Patent No.: US 9,429,991 B1
(45) Date of Patent: Aug. 30, 2016

(54) WEARABLE MEMORY CARD HOLDER

(71) Applicants: Joice S. Ruffing, Rapid City, SD (US); Juliana S. Evans, Katy, TX (US)

(72) Inventors: Joice S. Ruffing, Rapid City, SD (US); Juliana S. Evans, Katy, TX (US)

(*) Notice: Subject to any disclaimer, the term of this patent is extended or adjusted under 35 U.S.C. 154(b) by 0 days.

(21) Appl. No.: 14/460,842

(22) Filed: Aug. 15, 2014

Related U.S. Application Data

(63) Continuation-in-part of application No. 14/181,902, filed on Feb. 17, 2014.

(51) Int. Cl.
*G06F 3/00* (2006.01)
*G06F 1/16* (2006.01)

(52) U.S. Cl.
CPC .............. *G06F 1/163* (2013.01); *G06F 1/1635* (2013.01); *G06F 1/1698* (2013.01)

(58) Field of Classification Search
CPC .... G06F 1/163; G06F 1/1635; G06F 1/1698; G06F 1/1628; G06F 1/1626; H05K 5/0204; A41D 1/002
USPC ............................ 361/679.03, 679.4, 679.31; 361/679.55–679.58
See application file for complete search history.

(56) References Cited

U.S. PATENT DOCUMENTS

| | | | |
|---|---|---|---|
| 4,746,043 A | 5/1988 | Booker | |
| 5,883,576 A * | 3/1999 | De La Huerga | G04G 21/04 340/539.1 |
| 6,594,154 B1 | 7/2003 | Brewer | |
| 7,367,824 B1 | 5/2008 | Yen et al. | |
| 7,841,535 B2 | 11/2010 | Walker | |
| 7,942,293 B2 | 5/2011 | Lawrence | |
| 8,328,055 B1 | 12/2012 | Snyder | |
| 8,651,346 B1 | 2/2014 | Williams | |
| 8,659,418 B2 * | 2/2014 | Kreml | A61B 5/1118 128/920 |
| 2003/0019894 A1 | 1/2003 | Caldana | |
| 2003/0164389 A1 | 9/2003 | Byers | |
| 2004/0057578 A1 | 3/2004 | Brewer | |
| 2004/0233786 A1 | 11/2004 | Ting | |
| 2004/0251285 A1 | 12/2004 | O'Neill | |
| 2006/0166720 A1 | 7/2006 | Dixon | |
| 2006/0232922 A1 * | 10/2006 | Tong | G11B 33/12 361/679.21 |
| 2008/0017678 A1 | 1/2008 | Anderson | |
| 2008/0041898 A1 | 2/2008 | Chou | |
| 2008/0245831 A1 | 10/2008 | Simon | |
| 2009/0020570 A1 * | 1/2009 | Chan | A45F 5/00 224/222 |
| 2011/0199205 A1 | 8/2011 | Kreml et al. | |
| 2012/0080462 A1 | 4/2012 | Hajarian | |
| 2012/0255978 A1 | 10/2012 | Williams | |

* cited by examiner

*Primary Examiner* — Anthony Haughton
*Assistant Examiner* — Ingrid Wright
(74) *Attorney, Agent, or Firm* — The Juhasz Law Firm PC

(57) ABSTRACT

A wearable memory card holder for positioning on a limb of a wearer may comprise a band for at least partially encircling the limb of the wearer, and a memory card receptacle integrated with the band and configured to receive a memory card. A transmitter may be mounted on the band and configured to wirelessly transmit data from a memory card when the memory card is inserted into the memory card receptacle.

19 Claims, 3 Drawing Sheets

WEARABLE MEMORY CARD HOLDER

REFERENCE TO RELATED APPLICATIONS

This application is a continuation in part of U.S. patent application Ser. No. 14/181,902, flied on Feb. 17, 2014, which is hereby incorporated by reference in its entirety

BACKGROUND

Field

The present disclosure relates to apparel and more particularly pertains to a new wearable memory card holder for carrying one or two or more memory cards on the body of the card user in a location that is convenient for quick access while performing other tasks.

SUMMARY

In one aspect, the present disclosure relates to a wearable memory card holder for positioning on a limb of a wearer. The holder may comprise a band for at least partially encircling the limb of the wearer and a memory card receptacle integrated with the band and configured to receive at least one memory card.

In another aspect, the disclosure relates to a wearable memory card holder for positioning on a wrist of a wearer. The holder may comprise a band configured to form a loop to removably encircle the limb of the wearer, with the band forming a loop of adjustable circumference. The holder may also comprise a memory card receptacle integrated with the band and forming a socket including a cavity with a slot opening into the cavity for receiving one or more memory cards.

In still another aspect, the disclosure relates to a system including a memory card and a wearable memory card holder that may comprise a band configured to form a loop to removably encircle the limb of the wearer, the band forming a loop of adjustable circumference. The holder may also include a memory card receptacle integrated with the band and forming a socket including a cavity with a slot opening into the cavity. The memory card may be removably received in the socket of the memory card receptacle.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
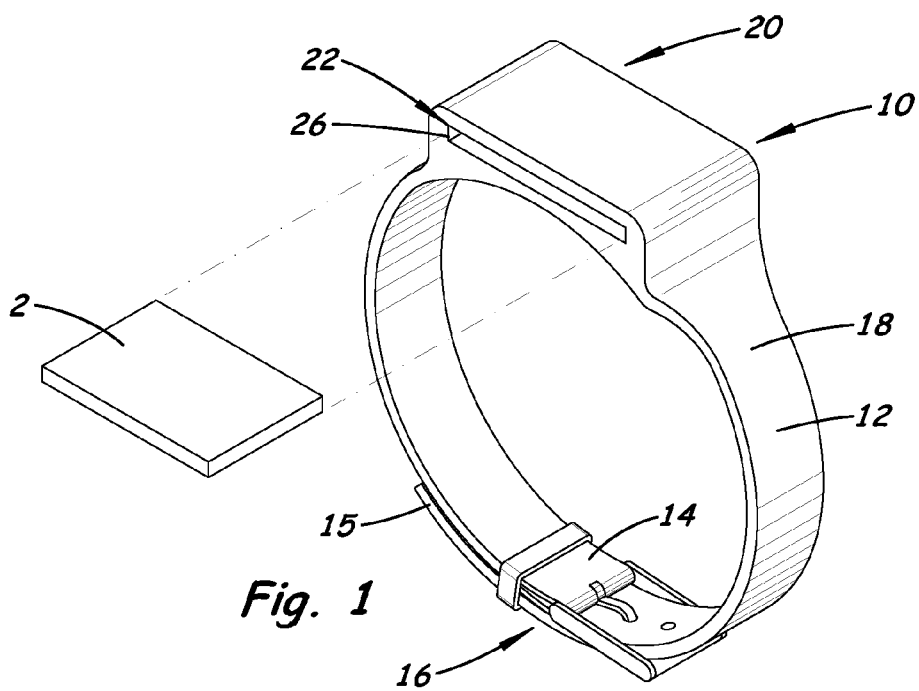
FIG. 1 is a schematic perspective view of a new wearable memory card holder according to the present disclosure.
Figure 2:
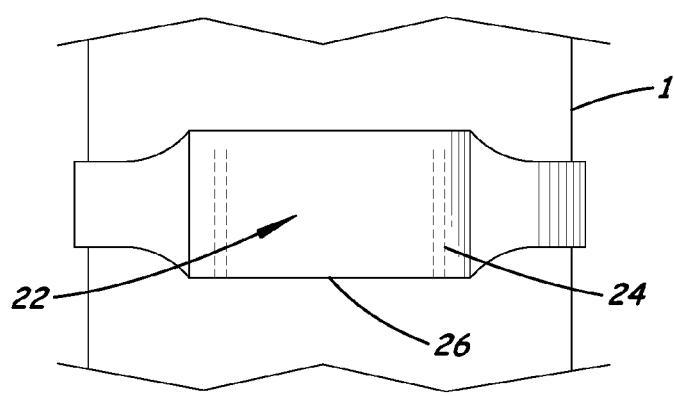
FIG. 2 is a schematic top view of the holder worn on an arm, according to an illustrative embodiment.
Figure 3:
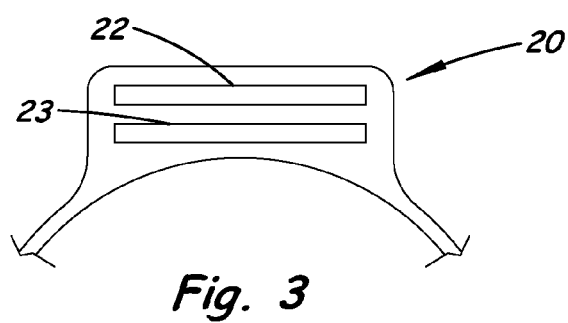
FIG. 3 is a schematic partial side view of the holder, according to an illustrative embodiment.
Figure 4:
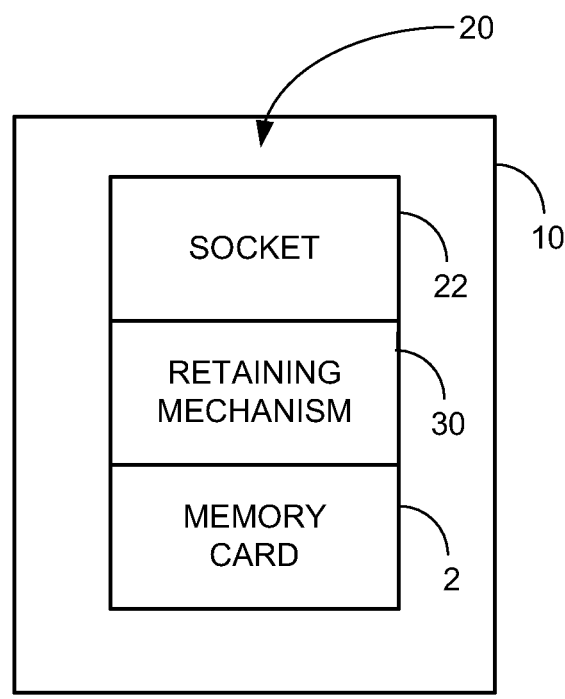
FIG. 4 is a schematic block diagram of the holder, according to an illustrative embodiment.
Figure 5:
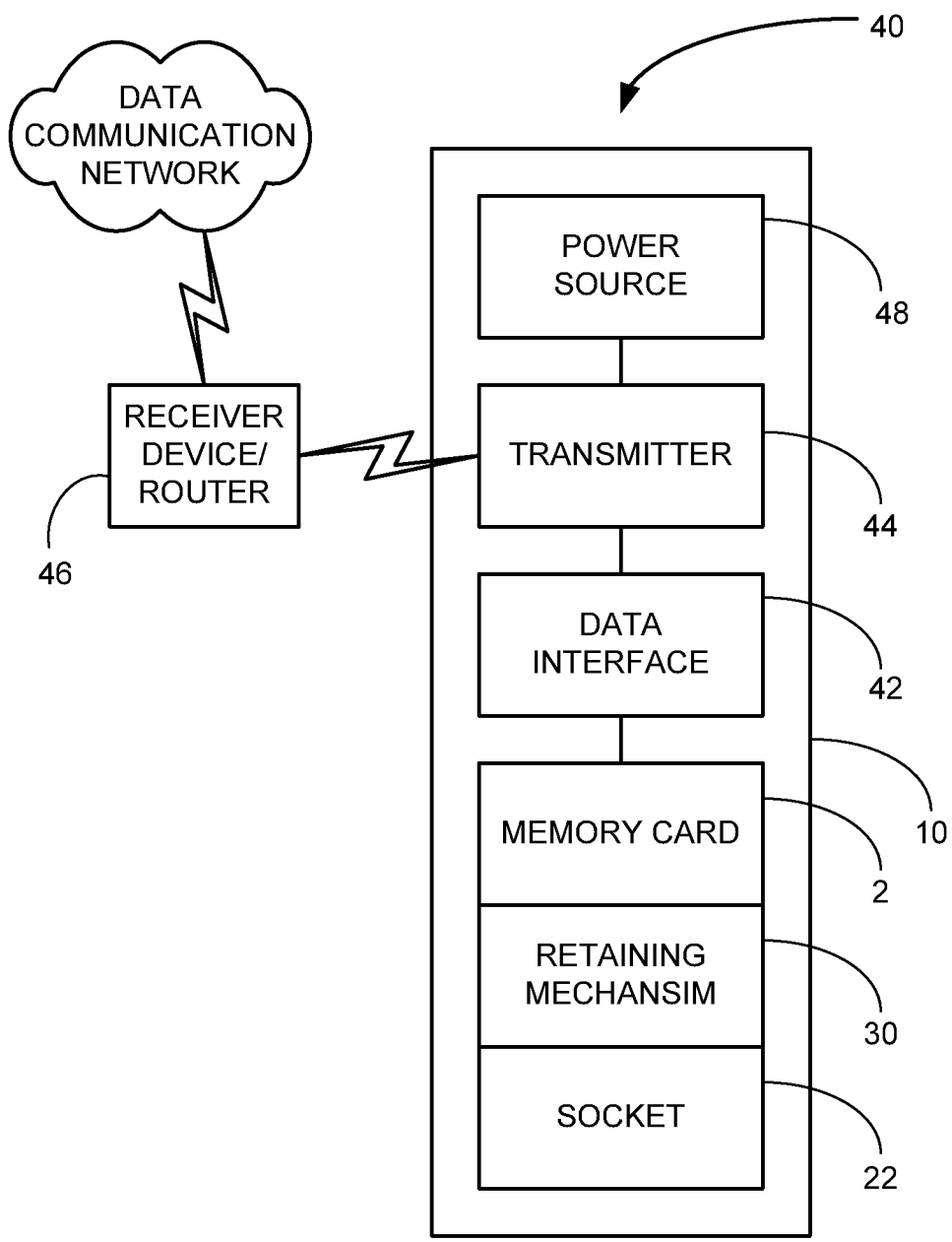
FIG. 5 is a schematic block diagram of another illustrative embodiment of the holder.

With reference now to the drawings, and in particular to FIGS. 1 through 5 thereof, a new wearable memory card holder embodying the principles and concepts of the disclosed subject matter will be described.

The applicants have recognized that, while digital photography and videography has simplified the creative process in many ways, the digital format is not without difficulties. Digital photos and videos encourage the professional photographer and videographer to take many more photos and minutes of video without have to worry about wasting film on poor shots, as poor photos and video may easily be deleted, and the digital memory cards are able to hold many more shots and minutes of video than analog film could. However, the storage of digital memory cards is not infinite, especially for photos and video taken at higher definitions, and therefore the cards do need to be changed out from the camera when full to capacity and replaced with another memory card. During photography and video filming, the interchange of memory cards can be just as interruptive as the changing of film, and even though the relatively small size of the video cards can make the cards more portable it may also make the cards more difficult to locate in a photography gear bag in a quick manner.

Applicants have also devised a solution to the problem of conveniently carrying and locating the memory cards which involves carrying the card on the body of the photographer or videographer in an easily accessible location for interchanging an empty memory card for a full memory card in the camera.

In general, the disclosure is directed to a wearable memory card holder 10 for positioning on a limb 1 of a wearer and removably receiving a memory card 2. The holder 10 may be configured to substantially encircle an arm of the wearer, such as in the forearm or wrist region of the arm. The holder may thus constitute a wrist-mountable device, and may be embodied as a bracelet.

In some greater detail, the holder 10 may comprise a band 12 for at least partially encircling the wrist of the wearer. The band 12 may form a continuous loop, although a partial or incomplete loop may also be employed. The band 12 may have opposite ends 14, 15 that are releasably connectable together to removably mount the loop on the limb of the wearer. The band 12 is preferably formed of a material that is flexible to permit the band to be flexed and curved about the wrist of the user to generally conform to the shape of the forearm of the user, although the band does not have to form a tight or snug fit about the wrist. In some embodiments, portions of the band may be relatively more flexible and other portions may be relatively less flexible, and as an example, the portions towards each of the ends 14, 15 of the band may be more flexible while a central portion in between the end portions is relatively less flexible, and may not have any flexibility at all. The releasable connection for the ends 14, 15 may be formed in any suitable connector structure 16 known to those skilled in the art such as, for example, clasps, snaps, buckles, and the like. Further, the loop may have an adjustable circumference size to accommodate different wrist sizes and may help provide a snug fit that resists inadvertent removal or loss. Illustratively the connector structure may be a conventional frame and prong configuration, although other structures may be utilized. The band 12 may have an exterior surface 18 that forms the exterior of the band. The exterior surface of the band may be decorated in any desired manner and may have many different styles from the plain and utilitarian (as illustrated in the drawings) to the pretentious.

The holder 10 may also include a memory card receptacle 20 that is configured to receive a memory card or cards 2. The receptacle 20 may be integrated with the band 12 so that the receptacle cannot be removed from the band, although the disclosure is not limited to embodiments in which the receptacle cannot be removed, and in some embodiments removability of the receptacle may be employed. The receptacle 20 may form a socket 22 that includes a cavity 24 with a slot opening 26 sized and shaped to receive at least a portion of the memory card. A memory card may be moved into a storage position with respect to the receptacle in which substantially an entirety of the card is positioned in the slot opening 26 and cavity 24 to help protect the card while the wearer acts and moves in a normal manner without concern for the holder 10 or the card 2. The storage position is not necessarily limited to a condition where the whole card is inserted into a cavity, and it should be recognized that the slot opening 26 may be located in and defined by the exterior surface 18 of the band, and may lead into the interior of the cavity 24 of the socket.

The card receptacle 20 may include a retaining mechanism 30 configured to permit the memory card to be moved into the storage portion in the socket and held in the storage position until a subsequent push on the memory card (or a lever adjacent the card) causes the mechanism to move the card from the storage portion to an eject position in which the card is at least partially ejected or moved out of the storage position which facilitates finger gripping of the card to pull the card completely out of the receptacle. Other means for retaining the card in the socket may utilized, such as those that exert a frictional grip or hold on the card that may be overcome by a sufficient degree of pulling on a portion of the card exposed out of the socket.

In some embodiments of the holder 10, the receptacle 20 may form a pair of sockets 22, 23 which are capable of simultaneously each holding one of a pair of cards in storage positions. In this configuration, additional cards 2 may be interchanged with the camera of the user.

Memory cards are available under a number of standards, including Compact Flash (CF), SmartMedia (SM), Memory Stick (MS), Multimedia Card (MMC), Secure Digital (SD), xD-Pictire Card (XD), as well as many others under standards previously developed and standards to be developed in the future. Although the memory card formats may be standardized, the size and shapes of the cards under the different standards can vary, and even within one particular memory card standard there may be "mini" and "micro" variations. To some degree the variations in size and shape may be accommodated by a single socket configuration, and the sockets commonly employed on computers for memory card readers provide enabling examples of sockets able to accept cards of different standards. Although a significant number of different memory card sizes may be accommodated by these known designs, it is possible that holders of different socket configurations may need to be employed to accommodate all of the different memory card standards.

It should be recognized that in most of the preferred embodiments of the holder, insertion of the memory card into the socket does not create an electrical contact or communication with any device that would access the circuits on the card or access the information or data stored on the card. The socket of the holder is merely provided for the purpose of providing storage and protection of the memory card between uses of the card in an electronic device that is able to electrically communicate with the circuitry of the memory card.

Some embodiments of a holder 40 may include a capability to download and transmit data, such as data files for photographs, when the memory card is inserted in the receptacle of the holder. Preferably, although not critically, the data is transmitted wirelessly from the holder 40 to a desired destination remote from the holder.

In greater detail, the holder may include a data interface 42 that is mounted on the band 12 and may be configured to read data on a memory card 2 when the card is received in the memory card receptacle 20 of the holder 40. The data interface 42 may be configured to establish a data connection with the memory card 2 when received in the socket 22 of the receptacle, such as when the card is in the storage position with respect to the receptacle 20. The data interface 42 may have any suitable configuration, but may include a plurality of electrical contacts positioned in the socket to contact the contacts that are positioned on the exterior of the memory card. The data interface may be suitably programmed and physically configured to read data from the memory card, and may also be configured to recognize the type and communication protocol for the particular type of memory card which is engaged with the receptacle 20, particularly if the data interface is designed and intended to work with memory cards of a variety of different standards.

The holder 40 may further include a transmitter 44 that is mounted on the band 12 and configured to wirelessly transmit data from a memory card 2 when the card is inserted into the memory card receptacle 20, and suitably connected to the data interface 42. The transmitter 44 may be in communication with the data interface 42 to in turn be in communication with a memory card received by the card receptacle 20, and may be able to receive data read from the memory card by the data interface when the memory card is inserted into the memory card receptacle. The transmitter 44 may be integrated into the band 12 so that the transmitter remains with the band at all times.

The transmitter 44 may be configured to communicate with a receiver 46 through wirelessly transmitted signals using any suitable communication standard. A few examples include Wi-Fi, Bluetooth, and near field communication (NFC), and typically may include standards that use relatively short range wireless communication, such as those that reach up to about 500 feet. Longer range wireless communications may require a significant amount of power that is not able to be supplied to the transmitter in a practical fashion. The receiver 46 may be any suitable receiver of signals of the protocol(s) being utilized by the transmitter 44. The receiver 46 may be associated with a network interface, which may include a wireless router, and may also interfaced with a larger data communication network such as, for example, the Internet. The transferred data may then be transmitted to other locations, including servers that function to store such information for later retrieval and is colloquially referred to as the "cloud."

The holder 40 may also include a power source 48 that is configured to provide power to the transmitter and the data interface, as well as any other elements of the holder that require electrical power. In some embodiments, the power source 48 comprises a battery, and the battery may be of the rechargeable type or the replaceable type.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A wearable memory card holder for positioning on a limb of a wearer, the holder comprising:
   a band for at least partially encircling the limb of the wearer;
   a memory card receptacle integrated with the band and configured to removably receive at least one memory card such that the at least one memory card may be removed from the receptacle on the band; and
   a transmitter mounted on the band and configured to wirelessly transmit data from a memory card when the memory card is inserted into the memory card receptacle.

2. The holder of claim 1 additionally comprising a data interface mounted on the band and configured to read data on a memory card received in the memory card receptacle, the data interface being in communication with the transmitter.

3. The holder of claim 2 wherein the data interface is configured to establish a data connection with the memory card when received in the memory card receptacle.

4. The holder of claim 1 wherein the transmitter is configured to communicate with a receiver associated with a network interface.

5. The holder of claim 1 additionally comprising a power source on the band configured to provide power to the transmitter.

6. The holder of claim 5 wherein the power source comprises a rechargeable battery.

7. The holder of claim 1 wherein the band forms a continuous loop.

8. The holder of claim 1 wherein the band forms a loop of adjustable circumference.

9. The holder of claim 1 wherein the receptacle forms a socket including a cavity with a slot opening into the cavity.

10. The holder of claim 9 wherein the card receptacle includes a retaining mechanism configured to permit the memory card to be moved into the socket into a storage position of the card and held in the storage position until a subsequent finger push causes the mechanism to at least partially eject the memory card from the socket to an eject position.

11. A system including:
    a memory card; and
    a wearable memory card holder comprising:
       a band configured to form a loop to removably encircle the limb of the wearer, the band forming a loop of adjustable circumference; and
       a memory card receptacle inseparably integrated with the band and forming a socket including a cavity with a slot opening into the cavity;
       a transmitter integrated with the band and configured to wirelessly transmit data from a memory card when the memory card is inserted into the memory card receptacle;
    wherein the memory card is removably received in the socket of the memory card receptacle such that the memory card is removable from the band without removing the receptacle from the band.

12. The system of claim 11 wherein the card receptacle includes a retaining mechanism configured to permit the memory card to be moved into the socket into a storage portion of the card and held in the storage position until a subsequent finger push causes the mechanism to at least partially eject the memory card from the socket to an eject position.

13. The system of claim 11 wherein the receptacle forms two sockets for holding two memory cards.

14. The system of claim 11 additionally comprising a data interface mounted on the band and configured to read data on a memory card received in the memory card receptacle, the data interface being in communication with the transmitter.

15. The system of claim 14 wherein the data interface is configured to establish a data connection with the memory card when received in the memory card receptacle.

16. The system of claim 11 wherein the transmitter is configured to communicate with a receiver associated with a network interface.

17. The system of claim 11 additionally comprising a power source on the band configured to provide power to the transmitter.

18. The system of claim 11 wherein the memory card receptacle includes two sockets configured to hold two memory cards independent of each other, each socket including a cavity and a separate slot opening into the cavity, the slot opening of both sockets being located in a first one of the edge faces of the opposite lateral edges of the band to permit insertion and removal of memory cards in the sockets using a same hand motion for both of the sockets; and wherein the band has a central portion and a pair of side portions extending from the central portion, the sockets of the memory card receptacle being positioned in the central portion, the central portion having a lateral width and a longitudinal length slightly larger than a width and length of the socket.

19. A wearable memory card holder for positioning on a limb of a wearer, the holder comprising:

a band for at least partially encircling the limb of the wearer;

a memory card receptacle inseparably integrated with the band and configured to removably receive at least one memory card such that the at least one memory card may be removed from the band without removing the receptacle from the band;

a transmitter integrated with the band and configured to wirelessly transmit data from a memory card when the memory card is inserted into the memory card receptacle;

a power source integrated with the band and configured to provide power to the transmitter; and a data interface mounted on the band and configured to read data on a memory card received in the memory card receptacle, the data interface being in communication with the transmitter, the data interface being configured to establish a data connection with the memory card when received in the memory card receptacle.

* * * * *